P. AMADEO.
SHOE SHINING MACHINE.
APPLICATION FILED SEPT. 6, 1916.
1,237,855.
Patented Aug. 21, 1917.
5 SHEETS—SHEET 3.
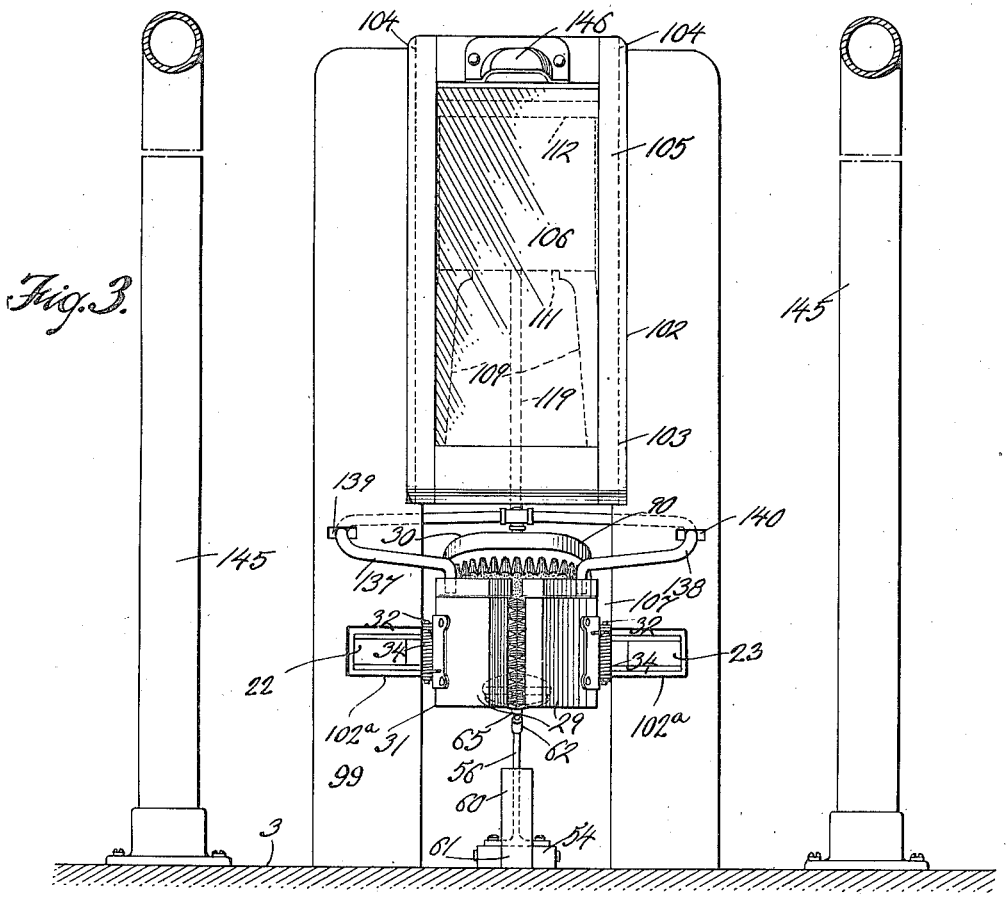
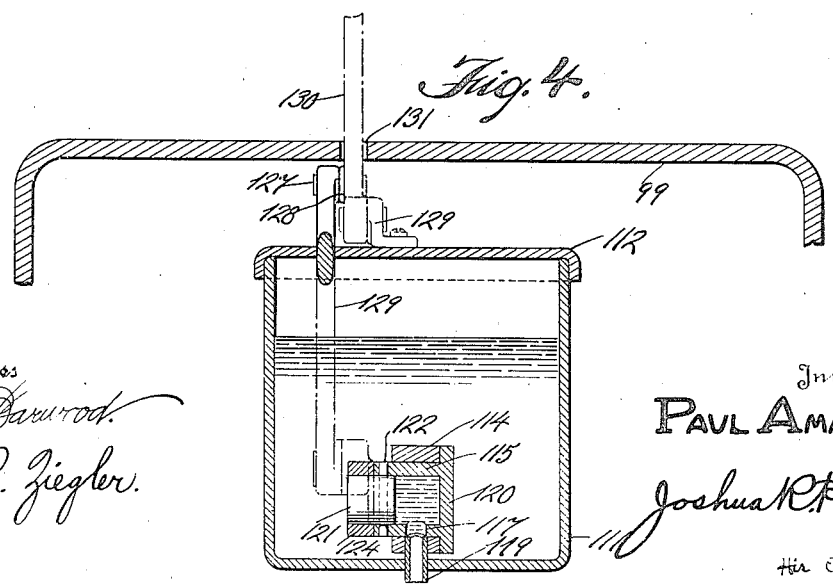

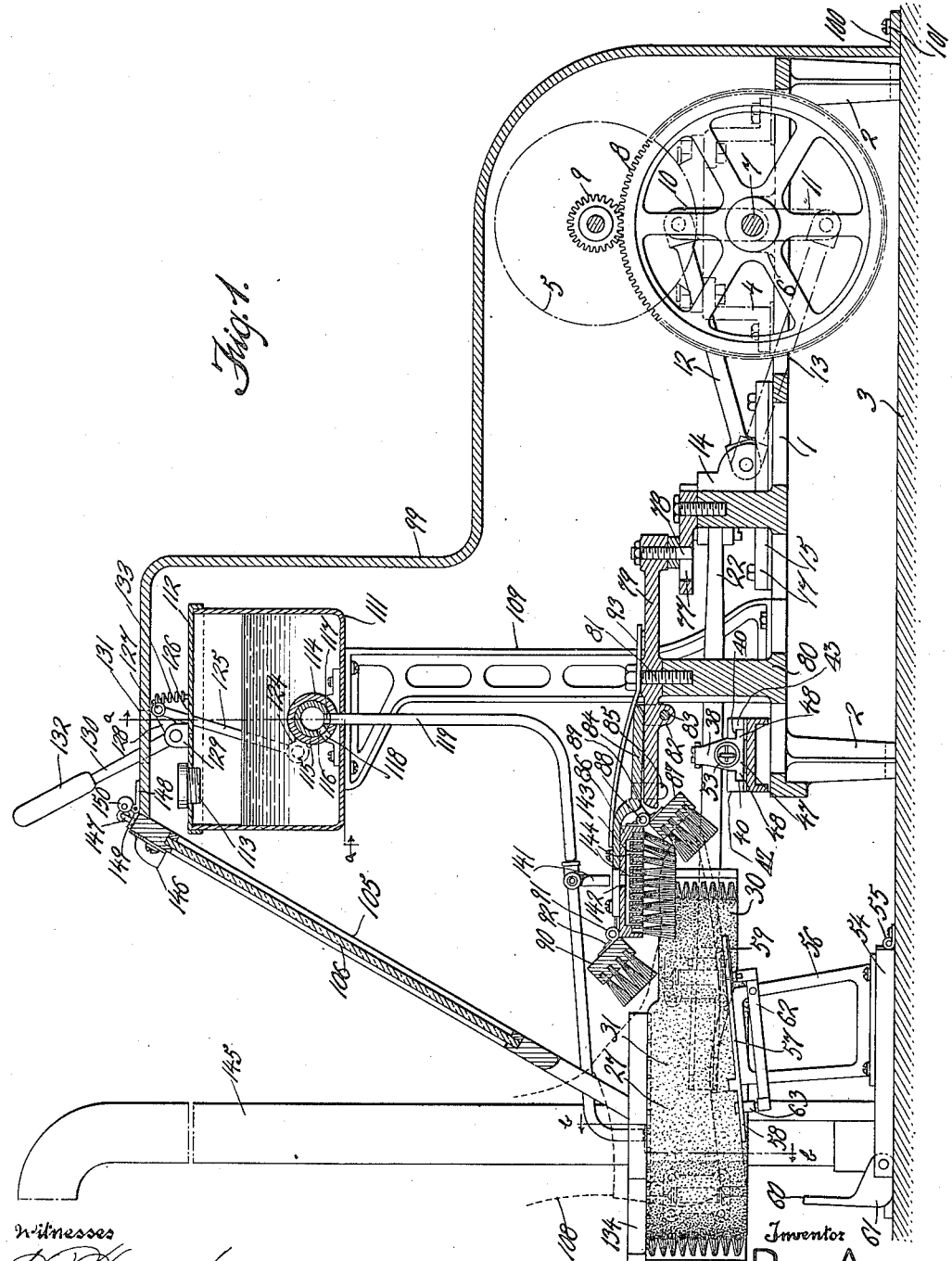

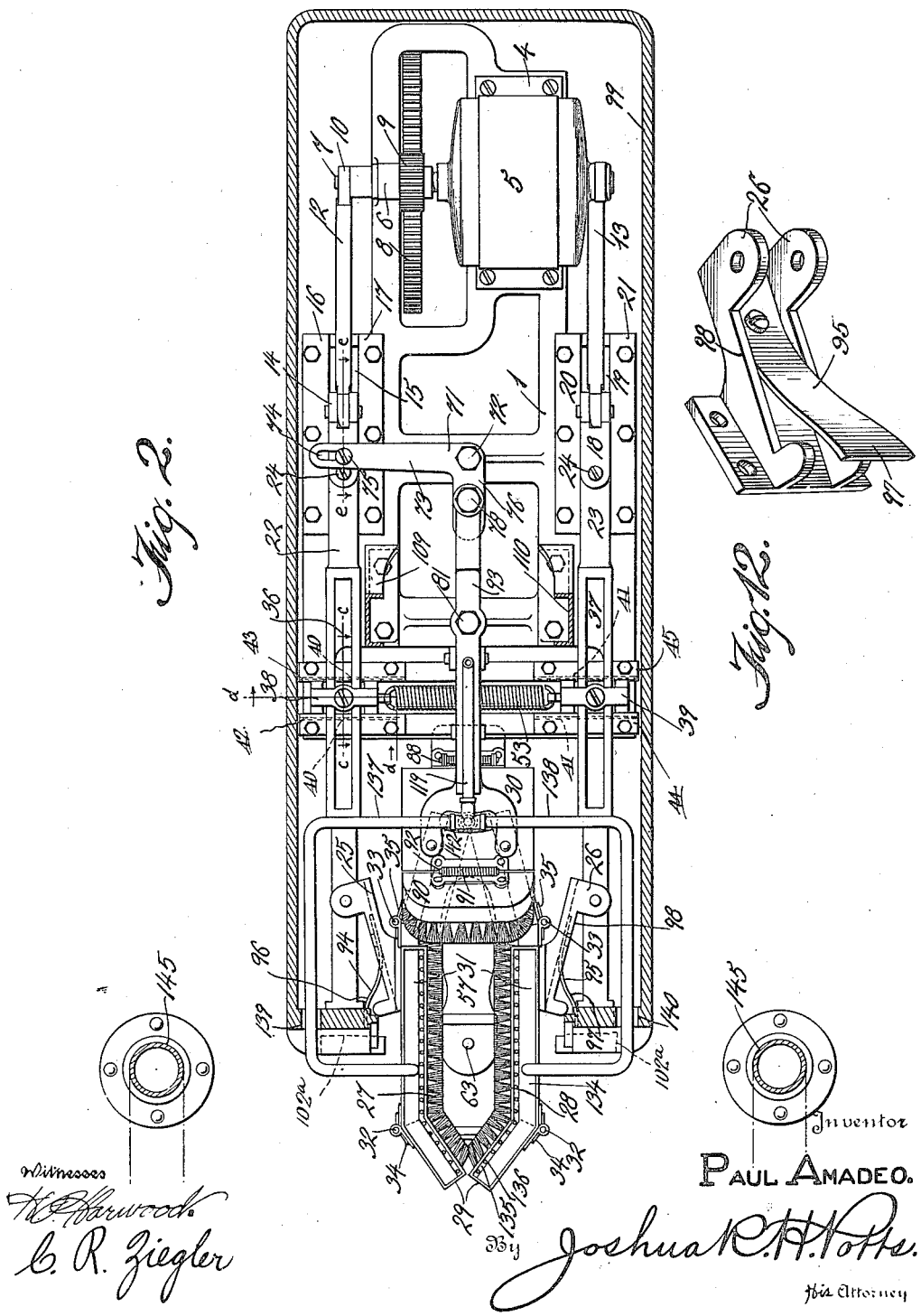

P. AMADEO.
SHOE SHINING MACHINE.
APPLICATION FILED SEPT. 6, 1916.
1,237,855.
Patented Aug. 21, 1917.
5 SHEETS—SHEET 4.
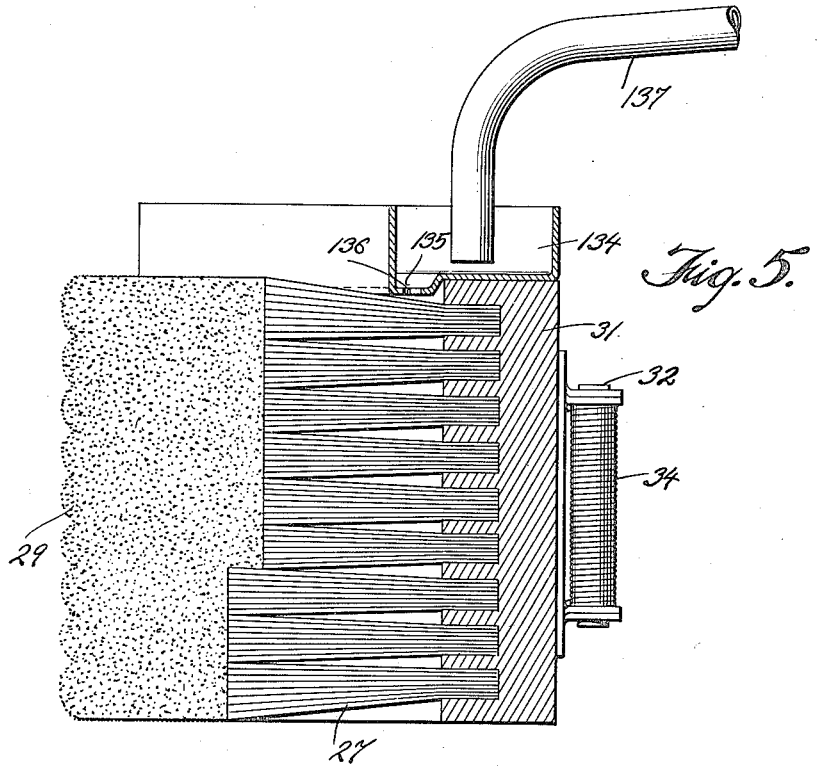
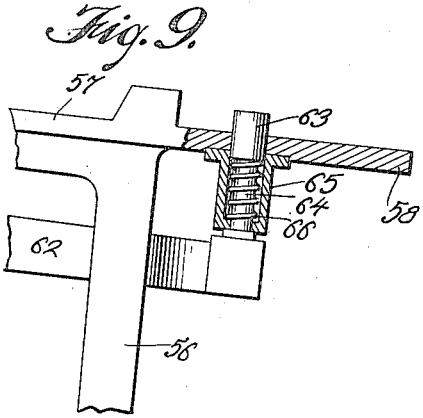
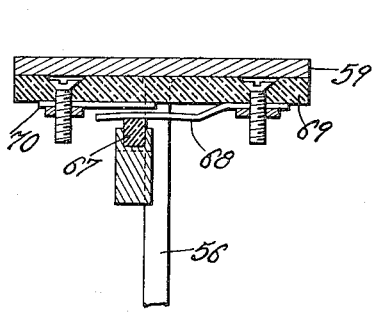
Witnesses
H. D. Harwood.
C. R. Ziegler.
Inventor
PAUL AMADEO.
By Joshua R. H. Potts.
His Attorney P. AMADEO.
SHOE SHINING MACHINE.
APPLICATION FILED SEPT. 6, 1916.
1,237,855.
Patented Aug. 21, 1917.
5 SHEETS—SHEET 5.
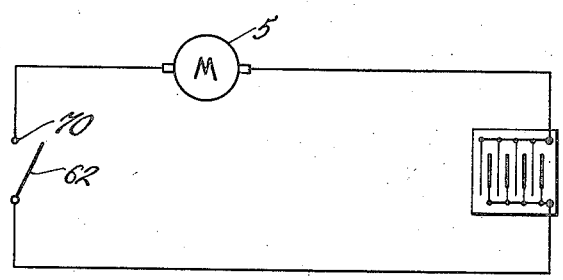
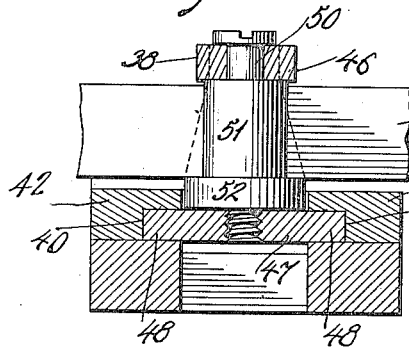
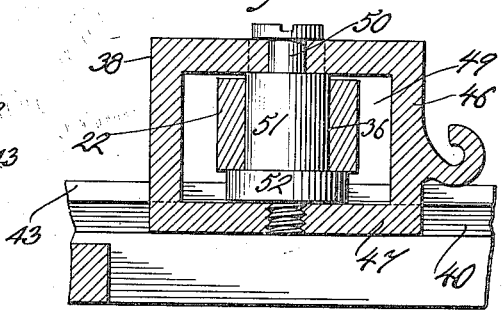
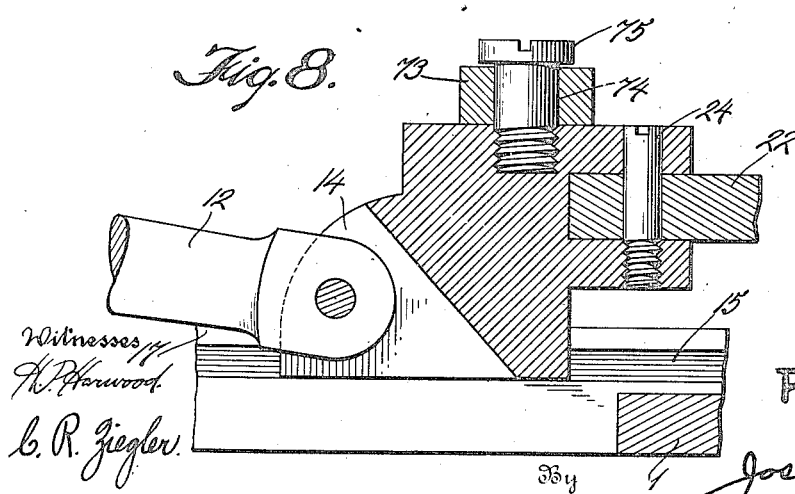
Inventor
PAUL AMADEO.

UNITED STATES PATENT OFFICE.

PAUL AMADEO, OF SHENANDOAH, PENNSYLVANIA.

SHOE-SHINING MACHINE.

1,237,855.  Specification of Letters Patent.  Patented Aug. 21, 1917.

Application filed September 6, 1916. Serial No. 118,753.

*To all whom it may concern:*

Be it known that I, PAUL AMADEO, a citizen of the United States, residing at Shenandoah, in the county of Schuylkill and State of Pennsylvania, have invented certain new and useful Improvements in Shoe-Shining Machines, of which the following is a specification.

My invention consists of an improved shoe shining machine, one object being to provide a machine which will automatically act to efficiently shine shoes of different sizes and shapes.

Another object is to so construct my improved machine that it will be of comparatively simple construction and will require but little power to operate it.

These objects, and other advantageous ends which will be described hereinafter, I attain in the following manner, reference being had to the accompanying drawings in which—

Figure 1 is a longitudinal sectional elevation of my improved machine.
Fig. 2 is a sectional plan view.

Fig. 3 is an elevation of the front end of my machine showing a supporting structure partly in section.

Fig. 4 is an enlarged sectional view taken on the line $a$—$a$ of Fig. 1.

Fig. 5 is an enlarged sectional view taken on the line $b$—$b$ of Fig. 1.

Fig. 6 is an enlarged section taken on the line $c$—$c$ of Fig. 2.
Fig. 7 is an enlarged sectional view taken on the line $d$—$d$ of Fig. 2.

Fig. 8 is an enlarged section taken on the line $e$—$e$ of Fig. 2.

Fig. 9 is a fragmentary sectional elevation of the heel portion of a shoe support which I employ.

Fig. 10 is a transverse section through the toe portion of said shoe support showing an electric switch which is closed when a shoe is placed on said support.

Fig. 11 is a diagrammatic view showing the wiring connection between the shoe support and a motor drive which I employ.

Fig. 12 is a perspective view of a brush supporting bracket which I employ.

Referring to the drawings, 1 is the main frame of my improved machine having legs 2 which are designed to be secured to a base 3 by bolts or other suitable means.
The frame 1 has an upwardly projecting support 4 for an electric motor 5. Journal bearings 6 are provided on the frame 1, directly below the motor, and a main shaft 7 is mounted to rotate in said bearings and is provided with a gear wheel 8, the latter being in mesh with a pinion 9 rotatable in conjunction with the motor.

The shaft 7 has two crank arms 10 and 11 secured thereon adjacent its ends, and these crank arms are respectively connected to connecting rods 12 and 13. The connecting rod 12 is pivotally connected to a head 14 slidable within a guide-way 15 provided by parallel grooved plates 16 and 17, while the connecting rod 13 is similarly pivoted to a head 18 which slides within a guide-way 19 provided with two other parallel grooved plates 20 and 21.

The crank arms 10 and 11 are preferably placed at substantially one hundred and eighty degrees (180°) to each other, and a rotation of said shaft will operate to reciprocate the heads 14 and 18 within their respective slide-ways.

The forward end of each of the heads 14 and 18 is yoked to provide a pivotal bearing for two bars 22 and 23. Vertical pivot pins 24 operate to pivotally secure said bars to their respective heads 14 and 18. The pivotal connection of these two bars is such as to permit movement toward and from each other or toward the axial center line of the machine as will be clearly understood from the illustration of Fig. 2.

Brackets 25 and 26 are pivotally connected to the bars 22 and 23 adjacent their free ends, and these brackets form a support for brushes 27 and 28. Each of said brushes is made in three sections, a heel shining section 29, a toe shining section 30, and an intermediate section 31.

The heel and toe sections are hinged to opposite ends of the intermediate section as shown at 32 and 33, and extend at angles thereto as clearly shown in Fig. 2. These hinges include coiled torsion springs 34 and 35 respectively which act to normally move the brush sections 29 and 30 into the angular position shown so as to move the bristles of the brush in close proximity to the heel and toe portions of the shoe, and since the heel and toe sections of said brushes 27 and 28 respectively extend at angles toward each other, it is possible to clean and shine the entire toe and heel portions of a shoe.

The brushes 27 and 28 are moved toward each other through the medium of the following mechanism:—The bars 22 and 23 are provided with elongated slots 36 and 37. Carriages 38 and 39 are slidable within slideways 40 and 41 which are provided by parallel plates 42, 43, and 44, 45, respectively, said sliding movement of the carriage being in a direction transverse to that of the heads 14 and 18.

Each of the carriages 38 and 39 consists of a frame 46 having a base 47 provided with extensions 48 which are confined within the slide-ways 40 or 41. The frame 46 of each carriage provides a central opening 49 through which the slotted portion of the bars 22 and 23 move.

Each of the carriages 38 and 39 is also provided with a pivot pin 50 which is arranged vertically and has a threaded portion which is screwed into the base 47. This pivot pin forms a support for a roller 51 which fits within the slot in a respective bar 22 or 23. The roller 51 is provided with a flange 52 at its lower end forming a support for the bar which extends through the opening 49. The adjacent ends of the carriages 38 and 39 are connected by a single coiled tension spring 53, said spring normally tending to move the bars 22 and 23 toward each other, and on their pivots 24 to cause movement of the brushes 27 and 28 toward each other.

A shoe support is mounted directly below the space between the brushes 27 and 28, said shoe support comprising a base plate 54 which is hinged at 55 to the base 3. A bracket 56 is secured to the base plate 54 and supports a shoe plate 57 having a heel extension 58 and a toe portion 59. The base plate 54 has hinged to the front end, a cam lever 60 which when depressed moves the cam portion 61 into engagement with the base 3, and thereby causes the forward end of the base plate 54 to be inclined, and with it to raise the bracket 56 to relatively change the position of the shoe plate to the brushes as will be hereinafter more fully described.

The bracket 56 forms a pivotal support for an electric switch lever 62, one end of said lever designed to be depressed by the downward movement of a push button 63 when the heel of a shoe is placed upon the shoe plate 57.

The push button 63 is connected to a plunger 64 which is slidable within a casing 65 secured to the under surface of the heel portion 58 of the shoe plate 57. This casing 65 forms a housing for a coiled expansion spring 66 which normally tends to move the button 63 upwardly (see Fig. 9).

The forward end of the switch lever 62 is provided with a finger 67 made of insulating material such as hard rubber, and is designed to engage a spring contact 68 secured to an insulating plate 69 on the bottom of the toe portion 59 of the shoe plate 57.

A second contacting member 70 is secured to said insulating plate 69 and electric wires connect these two contacting members 68 and 70 with the motor 5 and with a storage battery or other source of electric supply as shown in the diagrammatic representation in Fig. 11, so that by pressure downwardly upon the button 63, when a shoe is placed on said plate 57, the lever 62 will be moved on its pivot to actuate the contacting member 68 and form electrical connection between said member and the member 70 to complete the electric circuit and start the operation of the motor.

A bell-crank-lever 71 is pivoted at 72 to the frame 1, and has its arm 73 provided with a slot 74 through which a pivot screw or pin 75 extends, said pin being secured within the head 14.

The arm 76 of the bell-crank-lever 71 is slotted at 77 and into this slot projects a pin 78, the latter being positioned within a rocking lever 79 pivotally mounted on a stanchion 80 by a bolt 81. The forward end of the rocking lever 79 has a depending extension 82 forming a journal bearing for a pivot bolt 83, the latter forming a pivot bearing for a plate 84 having lateral ears 85 tending to span and prevent lateral movement of said plate with respect to the rocking lever 79.

The plate 84 forms a support for a brush 86 having downwardly projecting bristles which are designed to engage the upper toe portion of a shoe. An auxiliary toe brush 87 is hinged at 88 to the rear end of the brush 86, and a torsion spring 89 serves to move said brush 87 into contact with the extreme front end of the toe of the shoe and the sole portion.

An instep brush 90 is hinged at 91 to the forward end of the brush 86, and a torsion spring 92 serves to move said brush into contact with the instep part of a shoe. The pivot 83 permits an upward movement of the plate 84 with respect to the rocking lever 79, and a spring 93 operates to return or resiliently resist said upward movement.

It will be noted that the insertion of the shoe between the brushes 27 and 28 and under the brush 86 has a tendency to slightly raise the plate 84 and this raising movement will be resiliently resisted by the spring 93 to keep the brushes 86, 87, and 90 in firm contact with the shoe during the shining operation.

In addition to the resiliency provided by the spring 53 to the brushes 27 and 28, buffer springs 94 and 95 are secured to the outer surfaces of the brush supporting brackets 25 and 26, and the free end portions 96 and 97 are designed to engage the inner surface of the bars 22 and 23. These springs 94 and 95 also assist in moving the brackets 25 and 26 on their pivots to keep the brushes 27 and 28 in their proper positions relative to the sides, heel, and toe of the shoe. The springs 94 and 95 are prevented from moving laterally by side flanges 98.

The entire structure with the exception of the front ends of the brushes 27 and 28, and the front portion of the shoe supporting elements is inclosed within a casing 99 which has a flanged bottom edge 100 which is secured to the base 3 by bolts 101. This casing 99 has its forward end open as shown at 102, the opening being slightly extended at either side in the present instance as shown at 102ª to permit the forward ends of the bars 22 and 23 to move therethrough during their reciprocation, and the edges forming said end are provided with ribs 103 designed to engage grooves 104 formed in the edges of a slidable frame 105. This frame is provided with a pane of transparent material 106, preferably glass, so that it is possible to see a portion of the elements of my invention which are covered by said casing.

The lower portion of the front end of the casing 99 is open as shown at 107, so as to accommodate a foot having a shoe thereon as shown by the dotted lines 108 in Fig. 1.

Standards 109 and 110 are secured to the frame 1 of the machine, and at their upper end support a reservoir 111 for receiving the polishing liquid. The upper end of the reservoir 111 is closed by a cover 112 and has a threaded cap or stopper 113 which is screwed into a hole in the cover 112 so that by removing this stopper the polishing liquid may be poured in the reservoir.

A valve casing 114 is secured to the bottom of the reservoir 111 and has a cylindrical hollow valve 115 having an inlet port 116 and an outlet port 117. The inlet port is designed to register with an inlet port 118 in the casing 114, so that the liquid, when the valve is turned to the position shown in Fig. 1, will pass through the ports 118 and 116 to the interior of said valve, and thence out through the outlet port 117 to a pipe 119 which communicates with the interior of the casing 114, and is designed to register with the outlet port 117 when the ports 116 and 118 are in register one with the other, said position being shown in Fig. 1.

The valve 115 is closed at one end as shown at 120 (see Fig. 4), and has a plug 121 which is inserted in its opposite end to confine the liquid therein, and this plug 121 is secured by a pin 122. An arm 124 is secured to the plug 121, said arm being pivotally connected to one end of a link 125. This link passes through a slot 126 in the cover 112 of the reservoir and in turn is pivotally connected at 127 to a bell-crank-lever 128, said bell-crank-lever being pivotally mounted in a bearing 129 on the cover 112.

The arm 130 of the bell-crank-lever passes through a slot 131 in the top of the casing 99, and is provided with a handle 132. A tension spring 133 operates on the bell-crank-lever 128 to move the valve 115 in a position in which the ports are out of register, so that when in its normal position, none of the liquid will pass through the valve and out through the pipe 119. However, when the handle 132 is moved into the position shown in Fig. 1, the elements will operate to move the valve and permit the liquid to pass downwardly through said pipe 119.

Each of the intermediate sections of the brushes 27 and 28 is provided with a trough 134 having a groove or gutter 135 having perforations 136 in its bottom. The troughs 134 are of sufficient length to extend substantially throughout the entire length of the intermediate sections 31 and the heel sections 29. Branch pipes 137 and 138 communicate with pipe 119 and extend through openings 139 and 140 in the front of the casing 99 (see Fig. 3).

The free ends of these branch pipes 137 and 138 are positioned directly over the troughs 134 so as to supply the polishing liquid thereto, said polishing liquid passing downwardly through the perforations 136 onto the bristles of the brushes to be applied to the shoe during the operation of the machine.

Another branch pipe 141 communicates with the pipe 119 and has its free end positioned directly over an opening 142 in the top of the brush 86, said brush 86 being preferably hollow as shown at 143, the hollow portion being in communication with the opening 142.

A series of perforations 144 are formed in the brush 86 and communicate with the lower surface of said brush and with the hollow portion 143 so that the polishing liquid will pass downwardly and onto the bristles of said latter brush.

Supporting rails 145 are located adjacent the front of the casing 99 and are preferably formed of pipe to provide an arm rest for the patron during the shining operation. These rails are preferably arranged parallel as shown in Figs. 1, 2, and 3, of the drawing.

The slidable end frame 105 may be removed by sliding the same upwardly, and to facilitate this operation, I provide a handle 146 at the upper end thereof. Said slidable frame may be locked and to accomplish this end I preferably secure a staple 147 to the upper end of the slidable frame 105 and provide a hinged clasp 148 having a slotted plate 149 designed to pass over the staple 147.

This clasp 148 is secured to the upper portion of the casing 99 and a pad lock 150 or other securing means extends through the staple and acts to lock the slidable frame to the main casing 99.

In the operation of my invention, as soon as the heel of a shoe is placed upon the push button 63, a circuit is formed to actuate the motor 5 and through the medium of the pinion 9 and gear wheel 8, the shaft 7 is rotated.

The heads 14 and 18 receive a reciprocating movement in their slide-ways, this reciprocating movement being imparted to the bars 22 and 23, and consequently to the brushes 27 and 28. The tension spring 53 and the buffing springs 94 and 95 tend to keep the brushes 27 and 28 in contact with the intermediate side portions, the heel, and the front side portions of the shoe.

The brushes 86, 87, and 90 receive an oscillating movement due to the fact that the crank arm 71 is rocked through the medium of the slidable head 14 and the rocking lever 79. The shining liquid is supplied to the brushes by pulling the handle 132 and in so doing, said liquid passes through the pipe 119 and the respective branches and eventually to the brushes as above described.

With this construction it is noted that all parts of the shoe receive a shining action, and the structure is such as to keep the brushes in proper contact with the shoe at all times.

By the provision of the flexible hinge connections between the several sections of the brushes 27 and 28, and between the brushes 87 and 90 and the brush 86, the said brush sections are moved against their spring hinge connections to suit any shape or sized foot or shoe. It will be further noted that the single spring 53 acts to move both of the bars 22 and 23 to move the brushes 27 and 28 together, and to permit expansion of said brushes, since the spring 53 will yield to permit said bars 22 and 23 to pivot on their pivot points 24.

Furthermore, by providing the carriages 38 and 39 to slide relatively toward or from each other, and the inclusion of the rollers 51 which project through the slots 36 and 37 of said bars 22 and 23, a very easy and smooth sliding action of the several parts is attained.

It will be further noted that the spring 93 permits the plate 84 and with it the brushes 86, 87, and 90, to be raised and acts as a resilient pressure device to hold said brushes in contact with the shoe so as to prevent any harsh action upon the shoe.

With my invention, all of the parts are free moving, and the construction is such as to provide a durable series of elements which will not easily get out of order.

The foot support, as above stated, is movable through the medium of the cam lever 60 so as to change the relative position of the shoe supporting plate and the shoe to the brushes, so that different portions of the shoe may be reached by said brushes.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. The combination in a shoe shining machine, of two supporting members, means for alternately moving the supporting members longitudinally in forward and rearward directions, brushes on said members, two transversely movable carriages forming movable slideways for said members, means forming a slideway for said carriages, and a single tension spring secured to both of said carriages and operative to automatically move the brushes toward each other, substantially as described.

2. The combination in a shoe shining machine, of brushes designed to permit a shoe to be inserted therebetween, two longitudinally slidable heads, members operatively connected to said brushes and to said heads, elongated troughs on said brushes and having perforations communicating with the bristles of said brushes, and means for supplying polishing liquid to said troughs to be evenly distributed to the brushes through said perforations, substantially as described.

3. The combination in a shoe shining machine, of two supporting members, means for reciprocating the supporting members, brushes on said members, a rocking lever, a bell crank lever for oscillating said rocking lever, a plate pivoted on said rocking lever, means for operatively connecting said bell-crank-lever with one of said first supporting members, a brush secured to said plate and designed to receive an oscillating movement effected by said rocking lever and an independent movement attained by the movement of said plate on the rocking lever, substantially as described.

4. The combination in a shoe shining machine, of two supporting members, means for reciprocating the supporting members, brushes on said members, a rocking lever, a bell crank lever for oscillating said rocking lever, means for operatively connecting said bell-crank-lever with one of said first supporting members, a plate pivoted on said rocking lever, a brush secured to said plate and designed to receive an oscillating movement effected by said rocking lever and an independent movement attained by the movement of said plate on the rocking lever, a spring operative to keep said brush in resilient engagement with the toe portion of the shoe, and a brush resiliently hinged to the forward end of said latter brush and designed to resiliently engage the instep portion of the shoe, substantially as described.

5. The combination in a shoe shining machine, of brushes designed to permit a shoe to be inserted therebetween, a shoe support below said brushes, a base structure, means for hinging said support to the base structure, and a cam lever pivoted to said support and movable into engagement with said base structure to relatively change the position of said support with respect to the brushes, substantially as described.

6. The combination in a shoe shining machine, of brushes designed to permit a shoe to be inserted therebetween, two slidable heads, bars pivotally connected to said slidable heads and supporting said brushes, two transversely movable carriages slidably connected to said bars, a single tension spring connecting said carriages and operative to automatically move said bars toward each other, and means for moving said heads to actuate the brushes, substantially as described.

7. The combination in a shoe shining machine, of brushes designed to permit a shoe to be inserted therebetween, two slidable heads, bars pivotally connected to said slidable heads and supporting said brushes, said bars having slots therein, transverse members forming slide-ways, carriages movable in said slide-ways and having members respectively passing through the slots in said bars, and a tension spring for moving said carriages toward each other to move said bars on their pivots and to consequently move the brushes toward each other, substantially as described.

8. The combination in a shoe shining machine, of brushes designed to permit a shoe to be inserted therebetween, two slidable heads, bars pivotally connected to said slidable heads and supporting said brushes, transverse members forming slide-ways, carriages movable in said slide-ways and through which said bars respectively pass, and a tension spring for moving said carriages toward each other to move said bars on their pivots and to consequently move the brushes toward each other, substantially as described.

9. The combination in a shoe shining machine, of brushes designed to permit a shoe to be inserted therebetween, two slidable heads, bars pivotally connected to said slidable heads, brackets pivotally mounted on said bars, buffer springs interposed between said brackets and their bars, transverse members forming slide-ways, carriages movable in said slide-ways and through which said bars respectively pass, and a tension spring for moving said carriages toward each other to move said bars on their pivots and to consequently move the brushes toward each other, substantially as described.

10. The combination in a shoe shining machine, of brushes designed to permit a shoe to be inserted therebetween, two slidable heads, bars pivotally connected to said slidable heads and supporting said brushes, said bars having slots therein, transverse members forming slide-ways, carriages movable in said slide-ways and having rollers respectively passing through the slots in said bars, and a tension spring for moving said carriages toward each other to move said bars on their pivots and to consequently move the brushes toward each other, substantially as described.

11. The combination in a shoe shining machine, of a supporting structure, brushes designed to permit the shoe to be inserted therebetween, two slidable heads, bars pivotally connected to said slidable heads and supporting said brushes, means for automatically moving said bars toward each other, a rocking lever pivoted on the supporting structure, a bell-crank-lever pivoted on the supporting structure, said bell-crank-lever having one of its arms pivotally connected to said rocking lever and its other arm pivotally connected to one of said slidable heads, and a brush supported by said rocking lever, substantially as described.

12. The combination in a shoe shining machine, of brushes designed to permit a shoe to be inserted therebetween, two slidable heads, bars pivotally connected to said slidable heads and supporting said brushes, a single tension spring operative to automatically move said bars toward each other, means for moving said heads, troughs on said brushes and having perforations communicating with the bristles of said brushes, and means for supplying polishing liquid to said troughs, substantially as described.

13. The combination in a shoe shining machine, of brushes designed to permit a shoe to be inserted therebetween, two slidable heads, bars pivotally connected to said slidable heads and supporting said brushes, a single tension spring operative to automatically move said bars toward each other, means for moving said heads, said brushes each comprising sections resiliently hinged together, troughs carried by certain of said brushes and having perforations therein communicating with the bristles of said brushes, and means for supplying polishing liquid to said troughs, substantially as described.

14. The combination in a shoe shining machine, of brushes designed to permit a shoe to be inserted therebetween, two slidable heads, bars pivotally connected to said slidable heads and supporting said brushes, a single tension spring operative to automatically move said bars toward each other, means for moving said heads, said brushes each comprising sections resiliently hinged together, elongated troughs carried by certain of said brushes and having perforations therein communicating with the bristles of said brushes, a reservoir, valve mechanism in said reservoir, a pipe leading from said valve mechanism and having branches leading to said troughs, means for opening said valve to permit the liquid to flow through said pipes and thence to the troughs, substantially as described.

15. The combination in a shoe shining machine, of brushes designed to permit a shoe to be inserted therebetween, two slidable heads, bars pivotally connected to said slidable heads and supporting said brushes, means operative to automatically move said bars toward each other, means for moving said heads, troughs carried by certain of said brushes and having perforations therein communicating with the bristles of said brushes, and means for supplying polishing liquid to said troughs, substantially as described.

16. The combination in a shoe shining machine, of brushes designed to permit a shoe to be inserted therebetween, two slidable heads, bars pivotally connected to said slidable heads and supporting said brushes, a single tension spring operative to automatically move said bars toward each other, means for moving said heads, said brushes each comprising sections resiliently hinged together, elongated troughs carried by certain of said brushes and having perforations therein communicating with the bristles of said brushes, a reservoir, valve mechanism in said reservoir, a pipe leading from said valve mechanism and having branches leading to said troughs, means for opening said valve to permit the liquid to flow through said pipes and thence to the troughs, and means for automatically closing said valve, substantially as described.

17. The combination in a shoe shining machine, of brushes designed to permit a shoe to be inserted therebetween, two slidable heads, bars pivotally connected to said slidable heads and supporting said brushes, means operative to automatically move said bars toward each other, means for moving said heads, elongated troughs carried by certain of said brushes and having perforations therein communicating with the bristles of said brushes, a reservoir, valve mechanism in said reservoir, a pipe leading from said valve mechanism and having branches leading to said troughs, and means for opening said valve to permit the liquid to flow through said pipes and thence to the troughs, substantially as described.

In testimony whereof I have signed my name to this specification in the presence of two subscribing witnesses.

PAUL AMADEO.

Witnesses:
  JAMES S. HICKS,
  ROY P. HICKS.